(12) United States Patent
Kawakami et al.

(10) Patent No.: US 7,666,117 B2
(45) Date of Patent: Feb. 23, 2010

(54) POWER-TRANSMISSION CONTROL MECHANISM FOR LAWN MOWER

(75) Inventors: Toshiaki Kawakami, Saitama (JP); Hiroshi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 402 days.

(21) Appl. No.: 11/751,898

(22) Filed: May 22, 2007

(65) Prior Publication Data
US 2007/0275821 A1 Nov. 29, 2007

(30) Foreign Application Priority Data
May 24, 2006 (JP) .............................. 2006-144084

(51) Int. Cl.
*B60W 10/02* (2006.01)
(52) U.S. Cl. ................... 477/181; 477/174; 477/179; 477/180
(58) Field of Classification Search ............. 477/174, 477/179, 180; 290/40 R, 40 A, 51
See application file for complete search history.

(56) References Cited
U.S. PATENT DOCUMENTS

| | | | |
|---|---|---|---|
| 4,531,489 A | * | 7/1985 | Sturdy .................. 123/320 |
| 4,928,458 A | | 5/1990 | Muroya et al. |
| 6,805,218 B2 | * | 10/2004 | Wakitani et al. ........... 180/315 |
| 7,523,600 B2 | * | 4/2009 | Sasaoka ..................... 56/10.5 |
| 7,554,213 B2 | * | 6/2009 | Kawakami et al. ....... 290/40 R |

FOREIGN PATENT DOCUMENTS

| EP | 1 356 721 A1 | 10/2003 |
|---|---|---|
| JP | 58-191326 A | 11/1983 |
| JP | 09-000036 A | 1/1997 |

* cited by examiner

*Primary Examiner*—Ha D. Ho
(74) *Attorney, Agent, or Firm*—Westerman, Hattori, Daniels & Adrian, LLP

(57) ABSTRACT

In a power-transmission control mechanism for controlling transmission of power from an internal combustion engine of a lawn mower to mowing blades, a controller for an electromagnetic clutch periodically repeats: reading detected engine rotational speed during a predetermined time, when an operating switch is turned on; comparing present engine rotational speed read in the present cycle with previous engine rotational speed read in the previous cycle; engaging the electromagnetic clutch when the present engine rotational speed is equal to or higher than the previous engine rotational speed; and disengaging the electromagnetic clutch when the present engine rotational speed N is lower than the previous engine rotational speed. Thus, the power of the engine is reliably transmitted to the mowing blades without occurrence of engine stall and without being influenced by the load following characteristic of the engine, the clutch, and load fluctuation.

4 Claims, 13 Drawing Sheets

POWER-TRANSMISSION CONTROL MECHANISM FOR LAWN MOWER

BACKGROUND OF THE INVENTION

1. Field of the Invention

The present invention relates to a power-transmission control mechanism of a lawn mower wherein the power of an internal combustion engine is transmitted to a mowing blade through an electromagnetic clutch.

2. Description of the Related Art

A mechanical clutch such as a friction clutch is used in lawn mowers in order to control the transmission of power from the internal combustion engine to the mowing blades. Rapid load fluctuation in the internal combustion engine, which is caused by the load such as inertia of the blades, has been prevented by gradually engaging the clutch (going through a half clutch state). Heretofore, running stop (engine stall) of the internal combustion engine under the load has thus been prevented.

In a lawn mower using an electromagnetic clutch in its power transmission mechanism (for example, refer to JP-A-9-36), power is transmitted through the engagement between rotating disks. Thus, in this type of electromagnetic clutch, it is not possible to avoid rapid load fluctuation because there are no damping elements, and therefore engine stall tends to occur when load is applied.

In general, there has been known a method of pulse-driving the electromagnetic clutch in lawn mowers in which a large load fluctuation is apt to be imposed to the internal combustion engine when the electromagnetic clutch is engaged (for example, refer to JP-A-58-191326).

The power transmission control disclosed in JP-A-58-191326 is a control for pulse-driving the electromagnetic clutch by gradually increasing the pulse width.

A complex control circuit is required to pulse-drive the electromagnetic clutch while the pulse width is gradually increased. Further, load following characteristic of the internal combustion engine, the characteristic of the clutch, and load fluctuation need to be considered to set the pulse width. For this reason, it is not easy to set the pulse width. Even though the pulse width is set once, the set pulse width cannot cope with characteristic changes with time of the clutch.

In addition, when the electromagnetic clutch is pulse-driven, abrasion of the electromagnetic clutch is expedited because the clutch is maintained under a "half clutch" condition.

SUMMARY OF THE INVENTION

The invention has been made to solve the above problems, and it is an object of the invention to provide a power-transmission control mechanism of a lawn mower that is not influenced by the load following characteristic of the internal combustion engine, the characteristic of the clutch, and load fluctuation, and can reliably transmit power of the internal combustion engine to the mowing blades by using an electromagnetic clutch without the occurrence of the engine stall.

In order to achieve the abject, according to an aspect of the invention, there is provided a power-transmission control mechanism for a lawn mower wherein power of an internal combustion engine is transmitted to a mowing blade through an electromagnetic clutch, wherein the power-transmission control mechanism comprises: an operating switch that is turned on or off by an operator; an engine rotational speed detector that detects engine rotational speed of the internal combustion engine; and an electromagnetic clutch controller that controls operation of the electromagnetic clutch on the basis of an operation signal of the operating switch and the engine rotational speed detected by the engine rotational speed detector; wherein the electromagnetic clutch controller is configured to periodically repeats: reading the engine rotational speed detected by the engine rotational speed detector, during a predetermined time, when the operating switch is turned on, comparing a present engine rotational speed read in present cycle with a previous engine rotational speed read in a previous cycle, engaging the electromagnetic clutch when the present engine rotational speed is equal to or higher than the previous engine rotational speed, and disengaging the electromagnetic clutch when the present engine rotational speed is lower than the previous engine rotational speed.

According to this aspect of the invention, when the operating switch is turned on, the electromagnetic clutch controller periodically repeats: engaging the electromagnetic clutch when present engine rotational speed is equal to or higher than previous engine rotational speed, and disengaging the electromagnetic clutch when present engine rotational speed is lower than previous engine rotational speed. Therefore, the electromagnetic clutch is engaged when the engine rotational speed is increasing, and the electromagnetic clutch is disengaged when the engine rotational speed is decreasing, for a predetermined time, whereby engine stall due to continuous engagement of the electromagnetic clutch is prevented. It is thus possible to reliably engage the electromagnetic clutch without the occurrence of the engine stall.

Since the periodical control of the electromagnetic clutch is performed only within a predetermined time, abrasion of the electromagnetic clutch is suppressed. Further, since the electromagnetic clutch is controlled on the basis of engine rotational speed, it is possible to reliably transmit the power of the internal combustion engine to the mowing blade by using the electromagnetic clutch without the occurrence of the engine stall and without influence on the load following characteristic of the internal combustion engine, the characteristic of the clutch, and load fluctuation.

In order to achieve the abject, according to another aspect of the invention, there is provided a power-transmission control mechanism for a lawn mower wherein power of an internal combustion engine is transmitted to a mowing blade through an electromagnetic clutch, wherein the power-transmission control mechanism comprises: an operating switch that is turned on or off by an operator; an engine rotational speed detector that detects engine rotational speed of the internal combustion engine; and an electromagnetic clutch controller that controls operation of the electromagnetic clutch on the basis of an operation signal of the operating switch and the engine rotational speed detected by the engine rotational speed detector, wherein the electromagnetic clutch controller is configured to periodically repeats: reading the engine rotational speed detected by the engine rotational speed detector, during a predetermined time, when the operating switch is turned on, disengaging the electromagnetic clutch when the read engine rotational speed is lower than a lower limit engine rotational speed, which is lower than a specified engine rotational speed by a first predetermined rotational speed, engaging the electromagnetic clutch when the read engine rotational speed is equal to or higher than an upper limit engine rotational speed, which is lower than the specified engine rotational speed by second predetermined rotational speed, comparing the present engine rotational speed read in present cycle with a previous engine rotational speed read in a previous cycle, when the read engine rotational speed in the present cycle is equal to or higher than the lower limit engine rotational speed and is lower than the upper limit engine rotational speed, engaging the electromagnetic clutch when the present engine rotational speed is equal to or higher than the previous engine rotational speed, and disengaging the electromagnetic clutch when the present engine rotational speed is lower than the previous engine rotational speed.

According to this aspect of the invention, if the detected engine rotational speed is lower than the lower limit engine rotational speed and is far lower than the specified engine rotational speed, the electromagnetic clutch is maintained in the disengaged state. If the detected engine rotational speed is equal to or higher than the upper limit engine rotational speed and is close to the specified engine rotational speed, the electromagnetic clutch is maintained in the engaged state. If the detected engine rotational speed is an intermediate value between the lower and upper limit engine rotational speed and if the engine rotational speed is increasing, then the electromagnetic clutch is engaged, while if the engine rotational speed is decreasing, the electromagnetic clutch is disengaged. Thus the number of repetition of the engagement and disengagement of the electromagnetic clutch is reduced as much as possible, thereby further suppressing the abrasion of the electromagnetic clutch, whereby it is possible to reliably engage the electromagnetic clutch without the occurrence of the engine stall.

Further, when output deteriorates due to the decrease of the engine rotational speed caused by the characteristic of the internal combustion engine, it is possible that the engine rotational speed is repeatedly increased and decreased at a low level of engine rotational speed due to the load applied by the electromagnetic clutch. However, the electromagnetic clutch is forcibly disengaged in the case of the low engine rotational speed lower than the lower limit engine rotational speed. It is thus possible to prevent the repetition of the engagement and disengagement of the electromagnetic clutch at a low engine rotational speed.

In addition, the periodical control of the electromagnetic clutch is performed only within a predetermined time, and the number of the repetition of the engagement and disengagement of the electromagnetic clutch can be reduced as much as possible even within the predetermined time. Therefore, the abrasion of the electromagnetic clutch is further suppressed.

Furthermore, since the electromagnetic clutch is controlled on the basis of engine rotational speed, it is possible to reliably transmit the power of the internal combustion engine to the mowing blade by using the electromagnetic clutch without the occurrence of the engine stall and without influence on load following characteristic of the internal combustion engine, the characteristic of the clutch, and load fluctuation.

In order to achieve the object, according to another aspect of the invention, there is provided a power-transmission control mechanism for a lawn mower wherein power of an internal combustion engine is transmitted to a mowing blade through an electromagnetic clutch, wherein the power-transmission control mechanism comprises: an operating switch that is turned on or off by an operator; a throttle opening detector that detects a throttle opening of a throttle valve provided in an inlet system of the internal combustion engine; and an electromagnetic clutch controller that controls operation of the electromagnetic clutch on the basis of an operation signal of the operating switch and the throttle opening detected by the throttle opening detector, wherein the electromagnetic clutch controller is configured to periodically repeats: reading the throttle opening detected by the throttle opening detector, during a predetermined time, when the operating switch is turned on, engaging the electromagnetic clutch when the read throttle opening is smaller than an upper limit throttle opening, and disengaging the electromagnetic clutch when the read throttle opening is equal to or larger than the upper limit throttle opening.

According to this aspect of the invention, the electromagnetic clutch controller periodically repeats: engaging the electromagnetic clutch when the read throttle opening is smaller than an upper limit throttle opening; and disengaging the electromagnetic clutch when the read throttle opening is equal to or larger than the upper limit throttle opening. Therefore, when the throttle opening is equal to or larger than the upper limit throttle opening and the internal combustion engine does not have a margin in the output thereof, the electromagnetic clutch is disengaged. It is thus possible to reliably engage the electromagnetic clutch without the occurrence of the engine stall.

Further, since the periodical control of the electromagnetic clutch is performed only within the predetermined time, the abrasion of the electromagnetic clutch is suppressed.

In addition, since the electromagnetic clutch is controlled on the basis of throttle opening, it is possible to reliably transmit the power of the internal combustion engine to the mowing blade by using the electromagnetic clutch without the occurrence of the engine stall and without influence on the load following characteristic of the internal combustion engine, the characteristic of the clutch, and load fluctuation.

DESCRIPTION OF THE PREFERRED EMBODIMENTS

An embodiment according to the invention will be described below with reference to FIGS. 1 to 13.

A lawn mower 1 according to this embodiment is a hybrid self-propelled lawn mower that can rotate mowing blades 12 (see FIG. 2) by a four-stroke cycle internal combustion engine 10 to perform the mowing operation and can self-travel by a travel DC motor 30.

Figure 1:
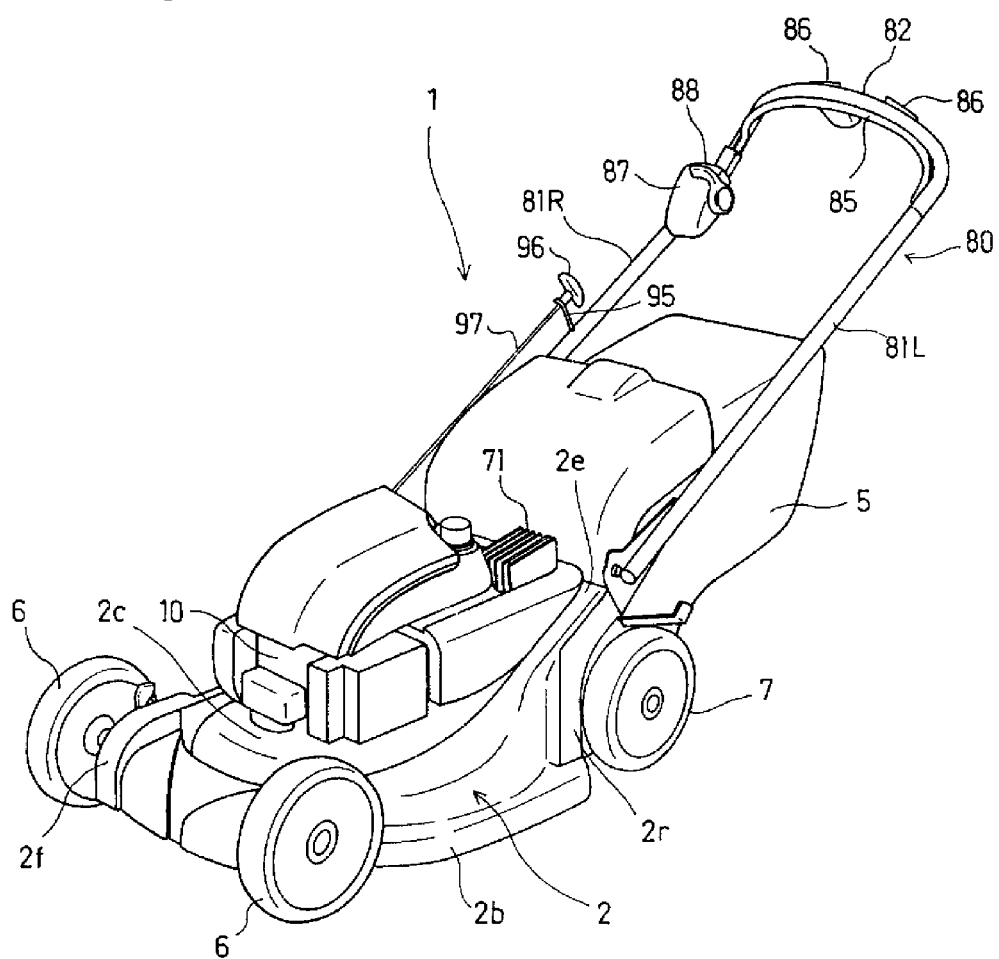
FIG. 1 is a perspective view showing an entire lawn mower to which a power-transmission control mechanism according to the invention is applied.
Figure 2:
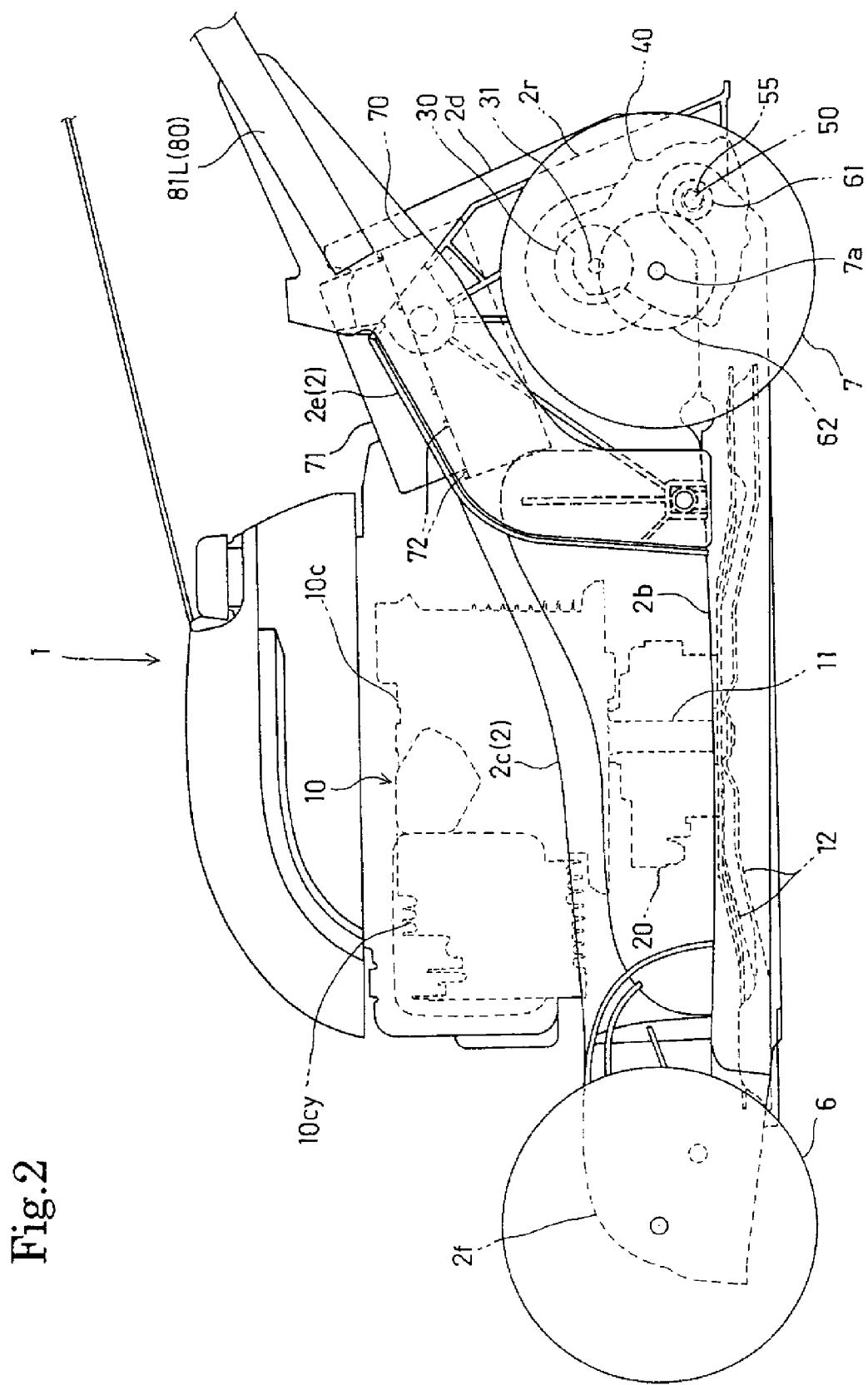
FIG. 2 is a side view of a body of the lawn mower.
Figure 3:
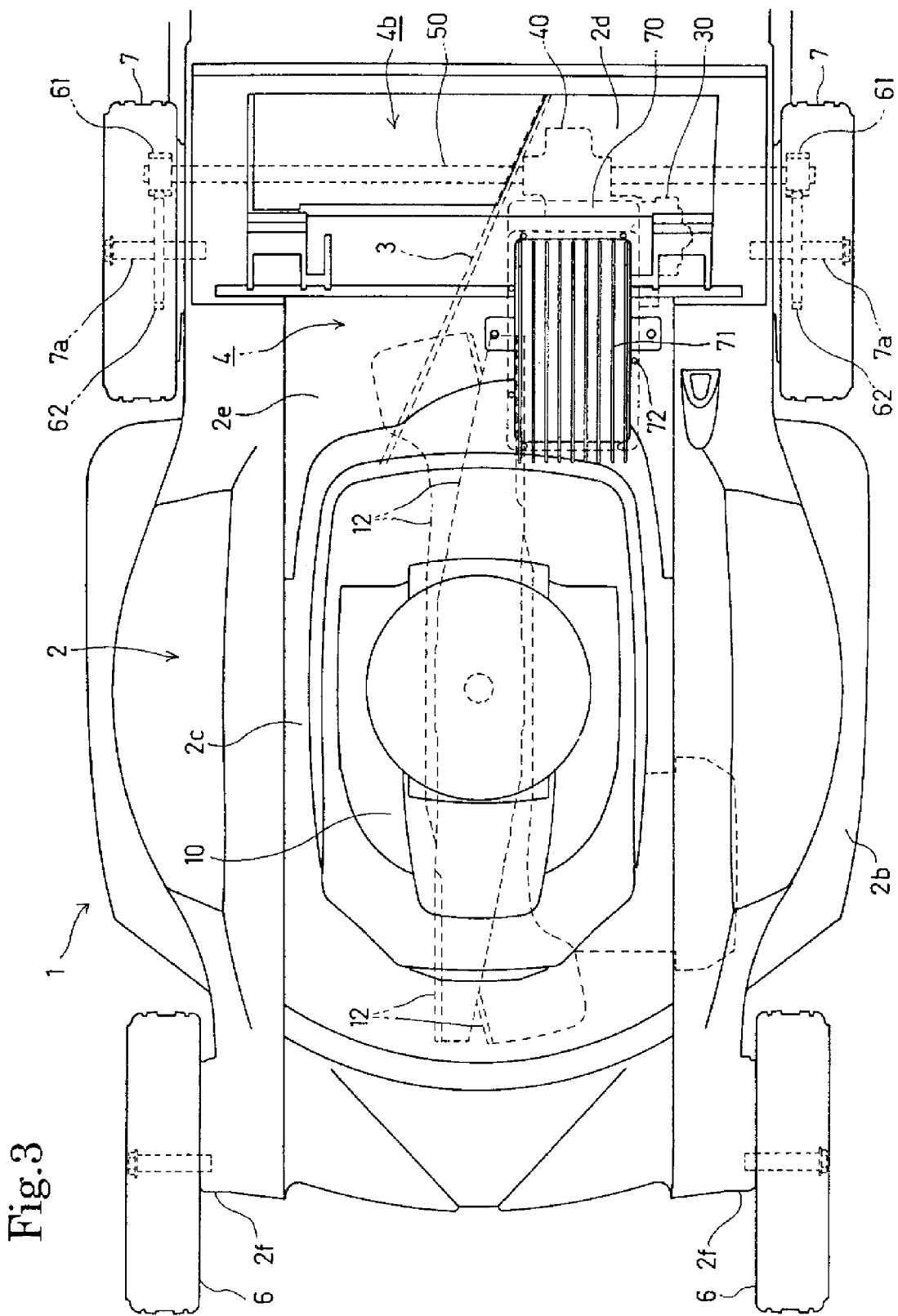
FIG. 3 is a plan view of the body of the lawn mower.
Figure 4:
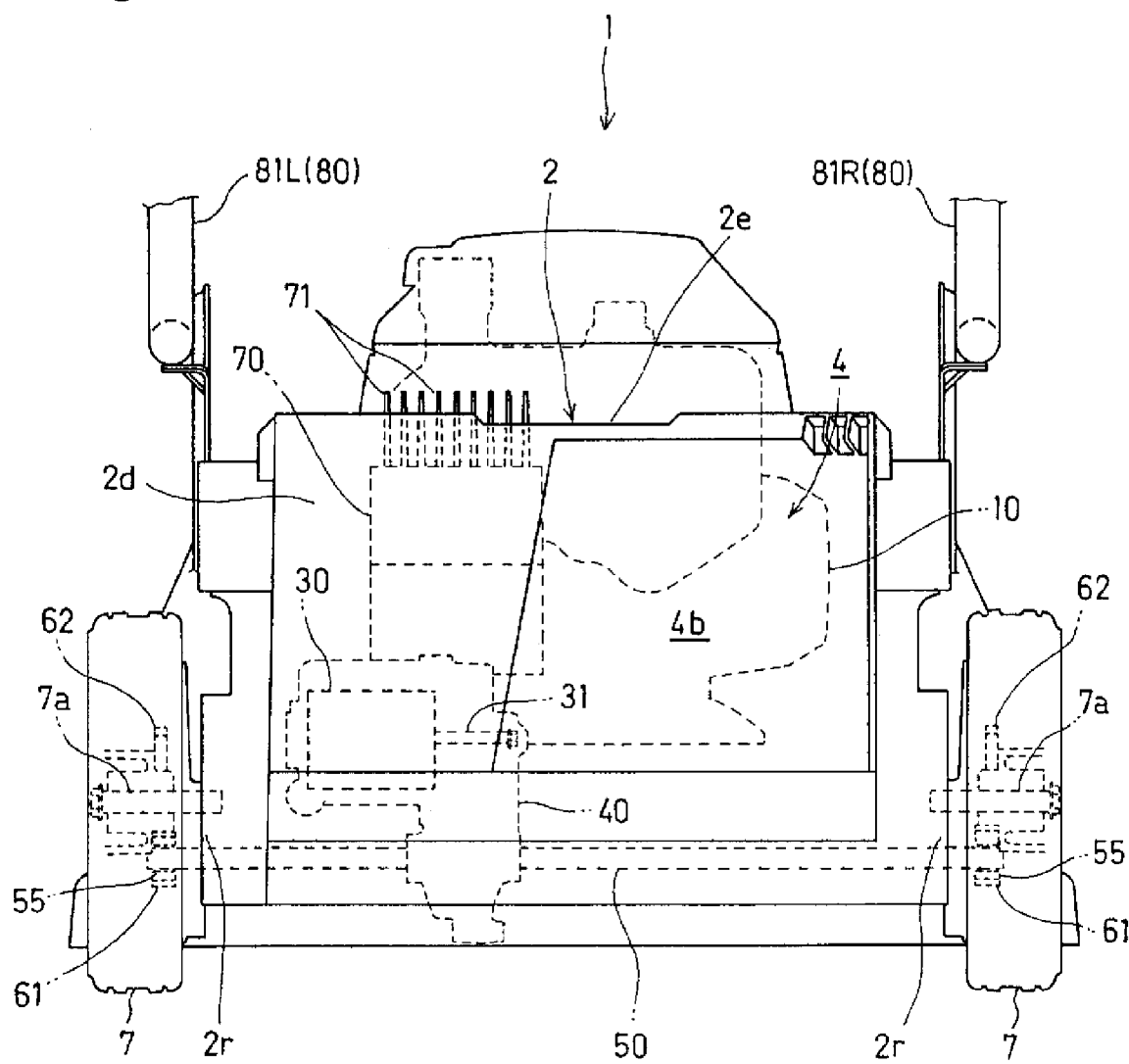
FIG. 4 is a rear view of the body of the lawn mower.

FIG. 1 shows a perspective view showing the entire lawn mower 1, FIG. 2 shows a side view of a body of the lawn mower, FIG. 3 is a plan view of the body of the lawn mower, and FIG. 4 is a rear view of the body of the lawn mower.

Referring to FIG. 1, a blade housing 2, which supports the mowing blades 12 (see FIG. 2) rotating above the ground and covers the blades from above, is supported by a pair of (left and right) front wheels 6 and 6 and rear wheels 7 and 7 so as to freely travel on the ground.

A direction in which the lawn mower 1 moves forward will be referred as a forward direction in the description, and the front, the rear, the left, and the right are determined on the basis of the above-mentioned direction.

Bearing portions 2f, 2f, 2r, and 2r, which support four shafts of the front and rear wheels 6, 6, 7, and 7, are provided at four corners of the blade housing 2. Further, the lower portion of a central portion 2c, which is surrounded by the bearing portions 2f, 2f, 2r, and 2r, of the blade housing 2 is formed to have the shape of a flat bowl, thereby forming a blade receiving portion 2b covering the blades 12. The rear half portion of the central portion 2c is expanded upward toward the rear side thereof, thereby forming an expansion portion 2e that is continuous to the rear side and expanded upward.

An internal combustion engine 10 is provided in the central portion 2c of the blade housing 2 so that a crankshaft 11 (see FIG. 2) is oriented in a vertical direction. In the internal combustion engine 10, cylinders 10cy are oriented toward the front side, and the crankshaft 11 protrudes downward from within a crank case 10c.

Figure 5:
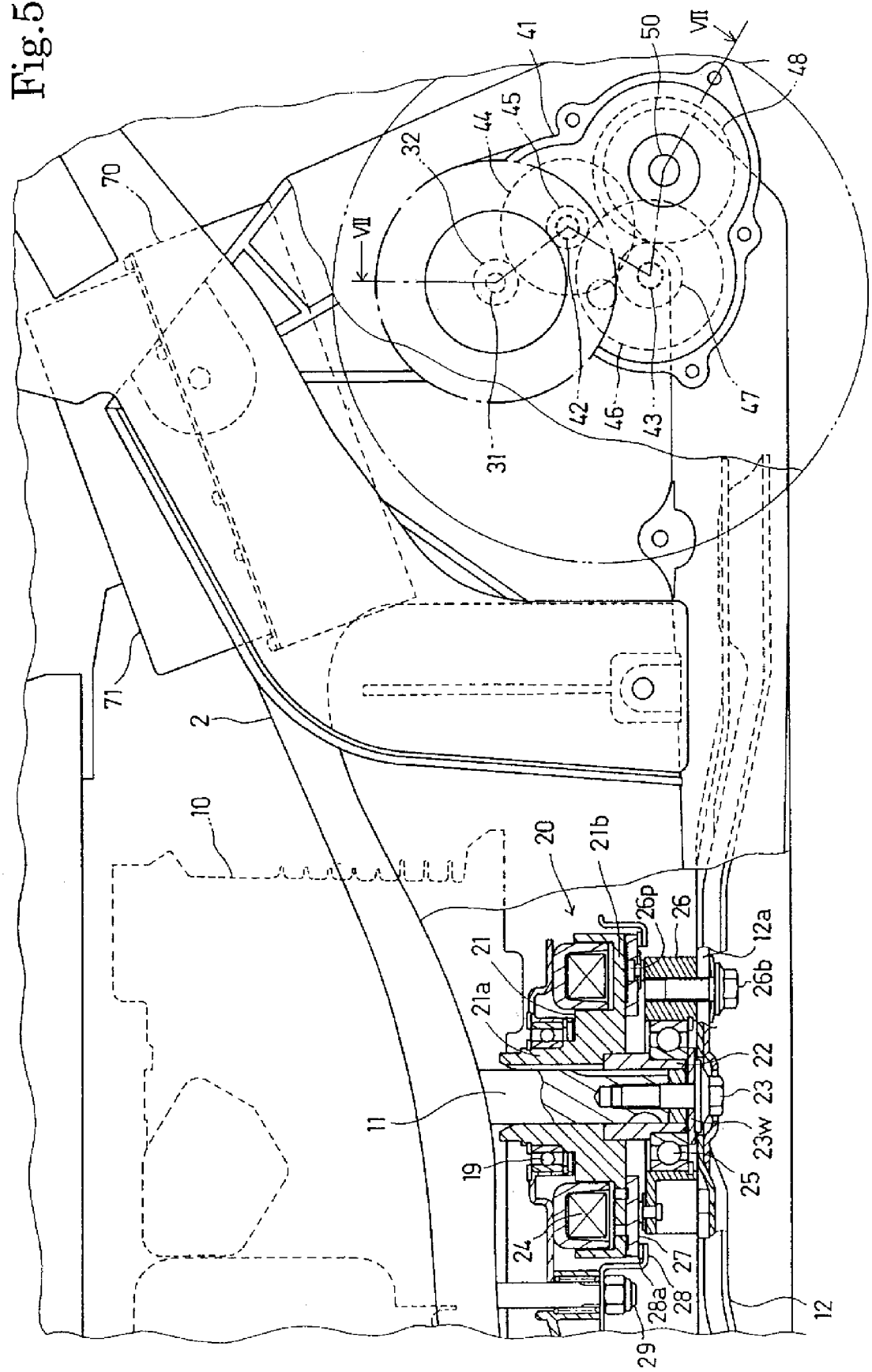
FIG. 5 is a side view, partly in section, of the lawn mower in which a part of the lawn mower is omitted.

As shown in FIG. 5, an electromagnetic clutch 20 is provided between the crankshaft 11 and the blades 12. Accordingly, if the electromagnetic clutch 20 is engaged during the operation of the internal combustion engine 10, the blades 12 are rotated. As a result, it is possible to perform the mowing operation.

A vertical partition plate 3 (see FIG. 3) is obliquely provided throughout from the right side of the central portion 2c to the expansion portion 2e at the posterior half of the blade housing 2. Further, the inside of the blade housing 2 is partitioned by the vertical partition plate 3, so that a lawn conveying passage 4 is formed.

The lawn conveying passage 4 is a passage, which is formed by partitioning the inside of the blade housing 2. The front end of the passage is opened to the blade receiving portion 2b, and the cross-sectional area of the passage is gradually increased from a front opening toward the rear side thereof. For this reason, a large rear opening 4b (see FIGS. 3 and 4) is formed in the rear wall, which is slightly inclined, of the expansion portion 2e.

The rear opening 4b of the lawn conveying passage 4 is largely opened to occupy an area larger than the right half portion of the rear wall 2d of the expansion portion 2e, and the front opening is connected to the rear opening 4b. A lawn collecting bag 5 shown in FIG. 1 is connected to the rear opening 4b to extend toward the rear.

The inside of the blade housing 2 is partitioned by the inclined vertical partition plate 3, so that the lawn conveying passage 4 is formed at the right portion in the blade housing. Further, a travel DC motor 30 and a speed reduction mechanism 40 are provided in a lower half of a left-side space, which is partitioned by the vertical partition plate 3.

As shown in FIG. 4, a motor driving shaft 31 of the travel DC motor 30 is disposed in the upper portion of the speed reduction mechanism 40, as an input shaft of the speed reduction mechanism 40. Further, the torque of the motor driving shaft 31 is transmitted to a driving shaft 50, which serves as an output shaft provided in the lower portion of the speed reduction mechanism 40, through the engagement of reduction gears at a reduced speed.

Figure 6:
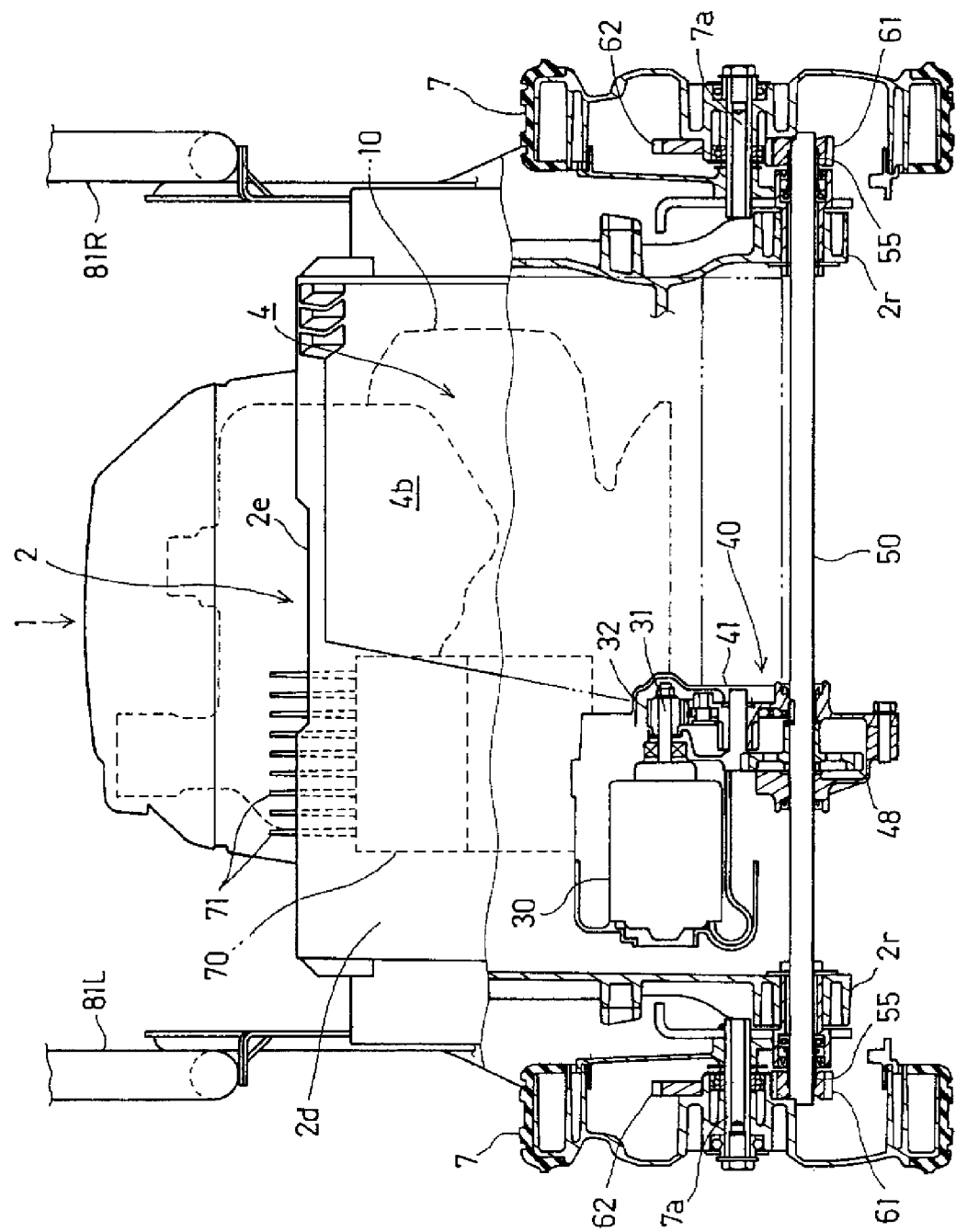
FIG. 6 is a rear view, partly in section, of the lawn mower in which a part of the lawn mower is omitted.

As shown in FIGS. 4 and 6, the driving shaft 50 extends in the left-and-right or transverse direction and is rotatably provided on the rear side of rear axles 7a and 7a by which the rear wheels 7 and 7 are rotatably supported. Further, driving gears 61 and 61, which are fitted to both ends of the driving shaft 50 with two-way or bi-directional clutches 55 interposed therebetween, are engaged with driven gears 62 and 62, which are integrally fixed to the rear wheels 7 and 7.

Accordingly, the torque of the motor driving shaft 31 of the travel DC motor 30 is transmitted to the driving shaft 50 through the speed reduction mechanism 40 at a reduced speed, and the torque of the driving shaft 50 is transmitted to the rear wheels 7 and 7 through the two-way or bi-directional clutches 55 and the engagement between the driving and driven gears 61, 61, 62, and 62. Therefore, the lawn mower 1 travels.

The two-way or bi-directional clutch is a clutch in which only forward directional power of the driving shaft of a driving source is transmitted to the driving wheels and both the forward and backward torques of the driving wheels are not transmitted to the driving shaft if the clutch is not engaged and in the disengagement state.

The operation control of the travel DC motor 30, the operation control of the internal combustion engine 10, and the engagement and disengagement control of the electromagnetic clutch 20, which transmits the power of the internal combustion engine 10 to the mowing blades 12, are performed by an ECU 70 (see FIGS. 2 and 4), which is an electronic control unit using a computer.

The ECU 70 is provided in an upper half of the left space of the lawn conveying passage 4, which left space is partitioned by the vertical partition plate 3 at the upper portion of the rear expansion portion 2e of the blade housing 2. The travel DC motor 30 is provided on the lower side of the ECU 70. The ECU 70 is received in a case having a rectangular parallelepiped shape, and a plurality of cooling fins 71 protrude in line from the upper surface of the case.

An inclined upper wall of the rear expansion portion 2e of the blade housing 2 is partially opened so that a rectangular opening is formed, and the rectangular opening is slightly smaller than the rectangular upper surface of the case of the ECU 70. As shown in FIG. 3, the cooling fins 71 are inserted into the rectangular opening from below so as to be exposed to the upper side. Further, the outer edges of the upper surface of the case of the ECU 70 come in contact with the edges of the rectangular opening, and are fixed to the edges of the rectangular opening with screws 72. Accordingly, the ECU 70 is supported on the upper wall of the blade housing 2.

Figure 7:
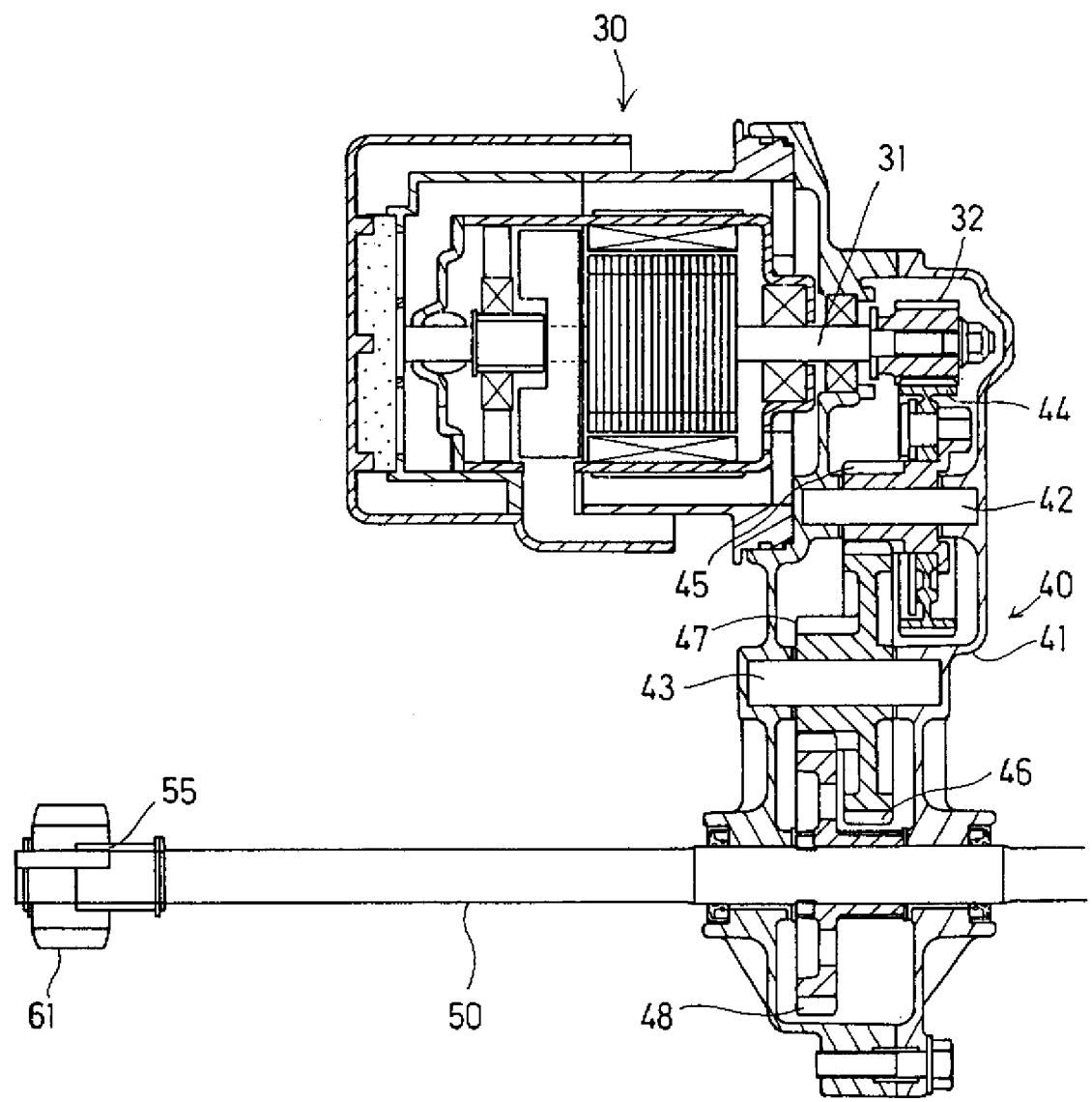
FIG. 7 is a sectional view of a travel DC motor and a speed reduction mechanism, taken along line VII-VII of FIG. 5.

A power transmission system will be described below with reference to FIGS. 5 to 7.

First, the structure of the electromagnetic clutch 20, which transmits the power of the internal combustion engine 10 to the blades 12, will be described with reference to a cross-sectional view of FIG. 5.

A rotary disk 21 is serration-fitted from below to the crankshaft 11, which protrudes downward from the internal combustion engine 10. In addition, a cylindrical collar 22 is fitted to the crankshaft 11 and then integrally fixed to the crankshaft 11 by using a flange bolt 23 with a washer 23w interposed therebetween. Accordingly, the crankshaft 11 and the rotary disk 21 rotate as a single body.

The rotary disk 21 is composed of a cylindrical portion 21a supported by a bearing 19 and a disk portion 21b formed at the lower end of the cylindrical portion. Further, the upper portion of an annular electromagnetic coil 24 is held, so that an annular electromagnetic coil 24 is suspended close to the upper surface of the disk portion 21b.

An annular blade supporting member 26 is provided on the outer peripheral surface of the collar 22 with a bearing 25 interposed therebetween so as to freely rotate relative to the crankshaft 11. Further, an annular base end 12a of the blades 12 comes in contact with the lower surface of the annular supporting member 26, and integrally fixed to the lower surface with a flange bolt 26b. Therefore, the blades 12 are supported to freely rotate with respect to the crankshaft 11.

A hollow disk-shaped clutch disk 27 is supported on the blade supporting member 26 so as to move up and down. That is, a plurality of pins 26p, which stands on the upper surface of the blade supporting member 26, passes through the clutch disk 27. The clutch disk 27 moves up and down with respect to the blade supporting member 26, but has the structure in which the rotation of the clutch disk 27 with respect to the blade supporting member 26 is limited.

The clutch disk 27 is close to the disk portion 21b of the rotary disk 21 and faces the disk portion. When moved upward, the clutch disk 27 comes in contact with the disk portion 21b. A friction member is attached to the portion, which comes in contact with the disk portion 21b of the rotary disk 21, of the upper surface of the clutch disk 27.

Further, an annular locking plate 28, which is fixed to the blade housing 2 with a bolt 29, is supported below the outer edge of the lower surface of the clutch disk 27. Friction members 28a are attached in an annular shape on the upper surface of the annular locking plate 28.

The electromagnetic clutch 20 has the above-mentioned structure. When current is not supplied to the electromagnetic coil 24 and the electromagnetic coil is demagnetized, the clutch disk 27 moves downward to be separated from the rotary disk 21. For this reason, although the crankshaft 11 and the rotary disk 21 rotate due to the driving of the internal combustion engine 10, power is not transmitted to the blade supporting member 26 and the blades 12 thus do not rotate.

Meanwhile, when current is supplied to the electromagnetic coil 24 and the electromagnetic coil is energized, the clutch disk 27 moves upward to be attached to the rotary disk 21 due to the magnetic force. For this reason, the torque of the crankshaft 11 causes the rotary disk 21 and the clutch disk 27 to rotate as a single body, and the torque of the clutch disk 27 is transmitted to the blade supporting member 26 through the pins 26p. Therefore, the blades 12 rotate.

In this case, when the electromagnetic coil 24 is deenergized, the clutch disk 27 is separated from the rotary disk 21 and moves downward to be placed on the friction members 28a of the annular locking plate 28. For this reason, the rotation of the clutch disk 27 and the blade 12 is limited due to inertia, so that the clutch disk 27 and the blades 12 stop.

Next, a travel driving system using the travel DC motor 30 will be described with reference to FIGS. 5 to 10.

As described above, the travel DC motor 30 and the speed reduction mechanism 40 are provided in the lower half of the left space, which is partitioned by the vertical partition plate 3, in the rear expansion portion 2e of the blade housing 2. Further, as shown in FIG. 7, the motor driving shaft 31 protruding from the right side of the travel DC motor 30 is inserted into the upper portion of a reduction gear case 41, and a motor driving gear 32 is fitted to the end of the motor driving shaft 31.

The driving shaft 50 passes through the lower portion of the reduction gear case 41 in a right-and-left or transverse direction. Further, two gear shafts 42 and 43 are provided between the motor driving shaft 31 and the driving shaft 50 in the reduction gear case 41. The gear shafts 42 and 43 are oriented in the right-and-left direction.

A large diameter gear 44, which is integrally fitted to a small diameter gear 45 rotatably supported by the gear shaft 42, is engaged with the driving gear 32.

A large diameter gear 46 and a small diameter 47, which are integrally formed with each other, are rotatably supported by the gear shaft 43. Further, the large diameter gear 46 is engaged with the small diameter gear 45, and the small diameter 47 is engaged with the large diameter gear 48 fitted to the driving gear 50.

The speed reduction mechanism 40 has the above-mentioned structure. The torque of the motor driving shaft 31 is transmitted to the driving shaft 50 at a reduced speed through the engagement of gears provided between the small diameter gear and the large gear.

The driving gears 61 and 61 are fitted to the both ends of the driving shaft 50 with the two-way or bi-directional clutches 55 and 55 interposed therebetween, and the driving gears 61 and 61 are engaged with the driven gears 62 and 62, which are integrally fixed to the rear wheels 7 and 7, respectively.

Accordingly, the bi-directional clutches 55 and 55 are engaged due to the operation of the travel DC motor 30, so that the rear wheels 7 and 7 rotate and the lawn mower 1 can travel.

If the travel DC motor 30 is stopped (with short-circuit) while stop electric power is being supplied to the motor, the two-way or bi-directional clutches 55 and 55 are retained in the disengagement state. If the bi-directional clutches 55 and 55 are in the disengagement state, the forward and backward (bi-directional) torque of the driving wheels 7 is not transmitted to the driving shaft 50. For this reason, the operator can easily push and pull the lawn mower 1 and easily change the direction of the lawn mower.

In the body of the lawn mower 1 having the above-mentioned structure, an operation handle 80 extends rearward from the upper portion of the rear expansion portion 2e of the blade housing 2.

The operation handle 80 is a member, which is obtained by bending a tubular member in a U shape. Left and right long handgrips 81L and 81R extend rearward in an obliquely upwardly sloping manner from the left and right sides of the rear expansion portion 2e of the blade housing 2, and the rear ends of the handgrips 81L and 81R are connected with each other through a grip part 82, thereby forming the operation handle 80.

The operation handle 80 is provided with various operation members, which are operated by the operator.

Figure 8:
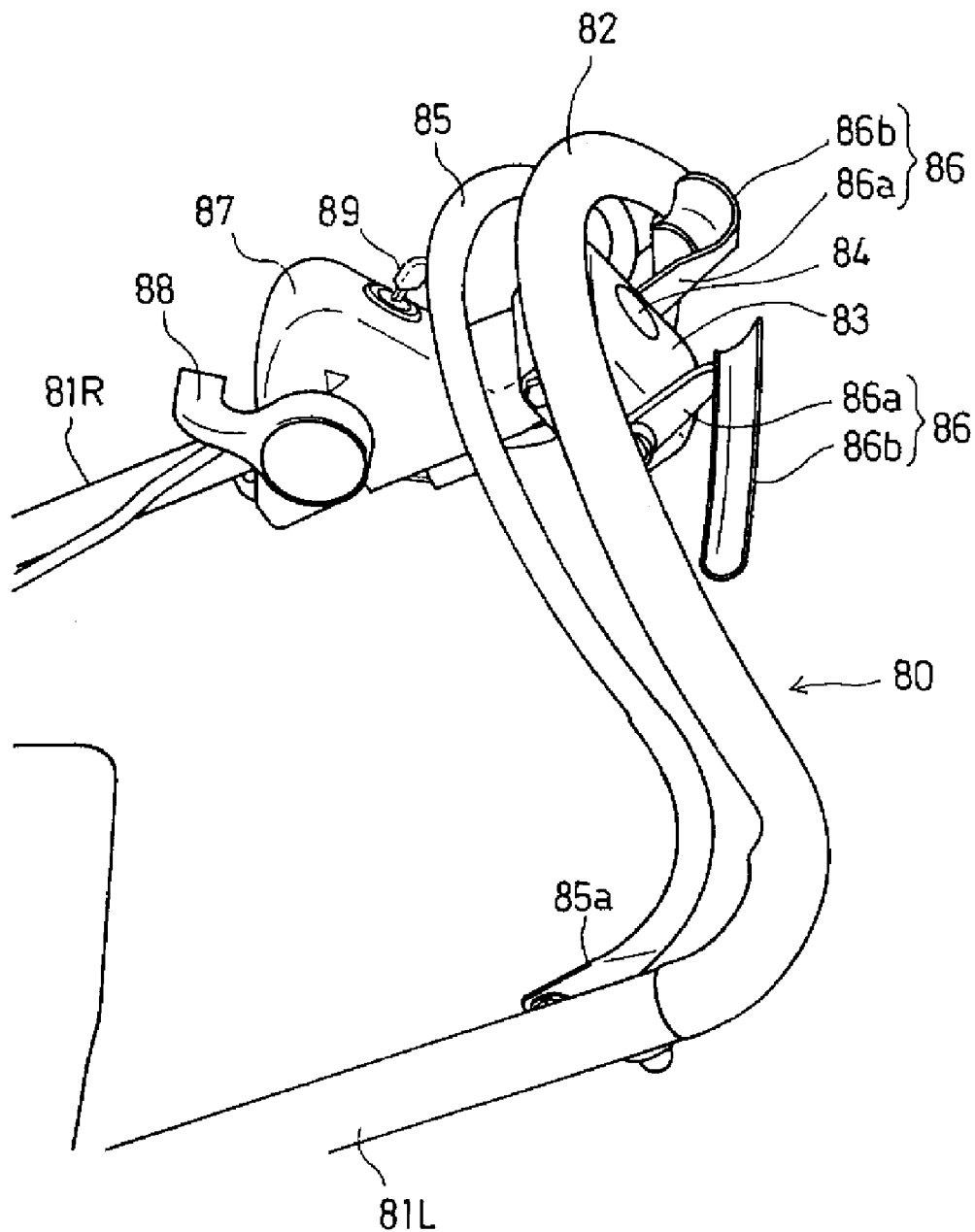
FIG. 8 is a perspective view showing the structure near a grip part of an operation handle.

Referring to FIG. 8, a first operating switch case 83 having a rectangular parallelepiped shape is fixed to a central portion of the grip part 82, which is convexly bent upward, so as to be depend downward from the central portion of the grip part. A push button 84 as a first operation member is provided on a rear surface of the first operating switch case 83.

A blade lever 85 as a second operation member is provided on the front side of the bent grip part 82 so as to be movable toward and away from the grip part 82.

A swing central shaft passes through right and left sidewalls of the first operating switch case 83. The swing central shaft has both ends thereof protruding outward. Base ends of left and right travel levers 86 and 86 are fitted to the both ends of the swing central shaft. Therefore, the left and right travel levers 86 and 86 can swing toward the rear side of the grip part 82.

Each of the travel levers 86 is composed of a swing arm 86a of which base end is fitted to the swing central shaft, and an operation portion 86b bent to the right or left from the end of the swing arm 86a.

When the left and right travel levers 86 and 86 swing forward, the operation portions 86b and 86b come into contact with the grip part 82. When the left and right travel levers swing rearward, the operation portions 86a are separated from the grip part 82.

Each of the operation portion 86b has a circular arc shape in cross-section and has the same shape as the grip part 82 so as to be fittable on the outer peripheral surface of the circular-tube-shaped grip part 82.

A second operating switch case 87 is attached to the inner portion of the right long handgrip 81R at a position near the grip part 82. Furthermore, a speed control lever 88 is provided on the left side surface of the second operating switch case 87, which has a triangular shape in side view. The speed control lever 88 is able to swing forward and rearward.

In addition, an ignition knob 89 is rotatably provided on the rear surface (facing the operator) of the second operating switch case 87.

Further, as shown in FIG. 1, a starting grip 96 is supported by a grip receiver 95, which protrudes upward from the right long handgrip 81R. A starting cable 97 extends forward from the starting grip 96, and is connected to a recoil starter (not shown) provided on the upper portion of the internal combustion engine 10.

Figure 9:
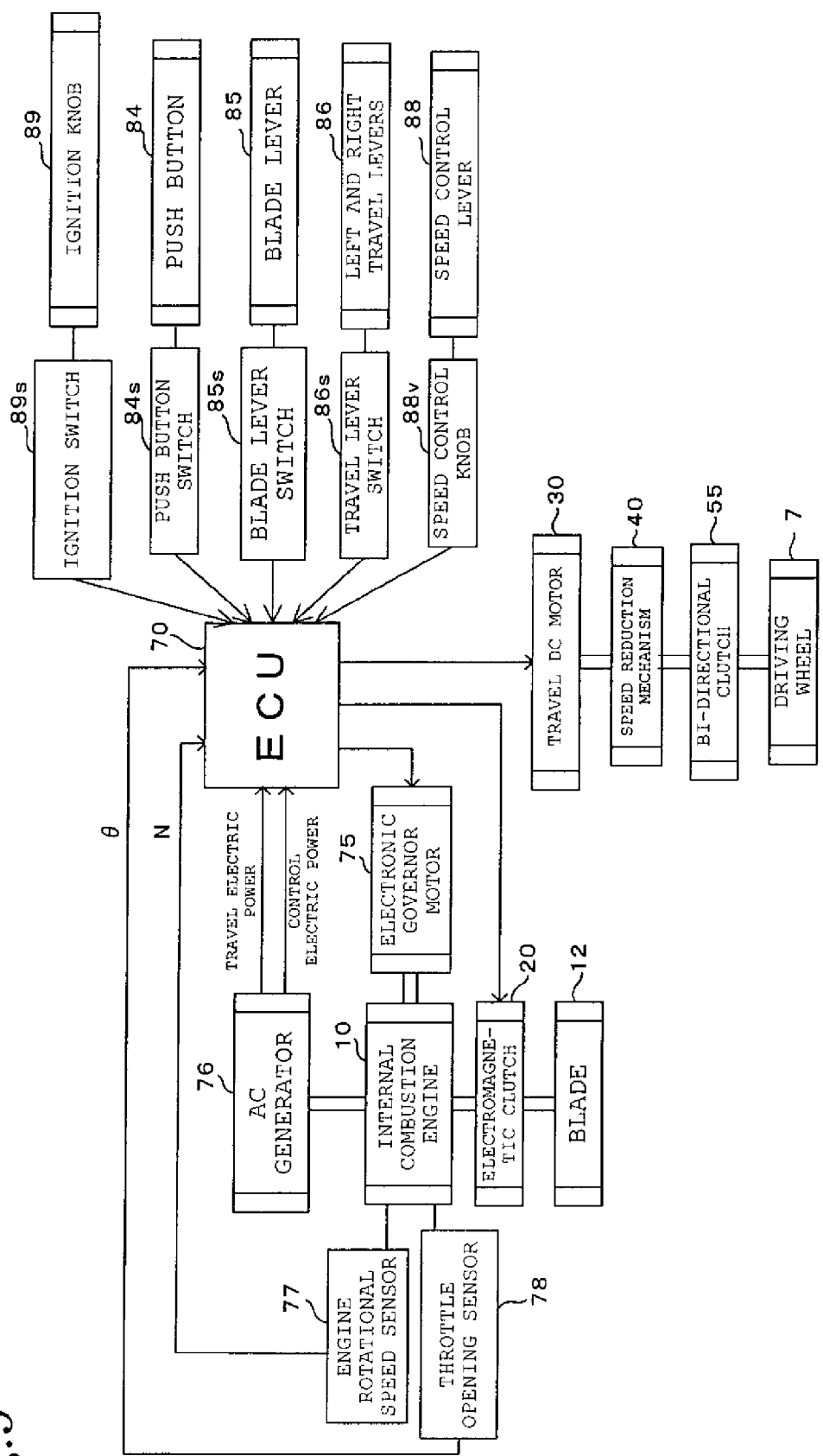
FIG. 9 is a schematic block diagram of a control system of the lawn mower.

As shown in FIG. 9, a push button switch 84s, a blade lever switch 85s, a travel lever switch 86s, a speed control knob 88v, and an ignition switch 89s are provided which are operated by the push button 84, the blade lever 85, the travel lever 86, the speed control lever 88, and the ignition knob 89. Signals from the push button switch 84s, the blade lever switch 85s, the travel lever switch 86s, the speed control knob 88v, and the ignition switch 89s are input to the ECU 70.

A schematic block diagram of a control system of the lawn mower 1 is shown in FIG. 9.

The internal combustion engine 10 is provided with an electronic governor mechanism that maintains a constant engine rotational speed, and the ECU 70 controls an electronic governor motor 75 for driving a throttle valve of the internal combustion engine 10.

The ECU 70 controls the operation of the electromagnetic clutch 20 and the travel DC motor 30.

The internal combustion engine 10 is provided with an AC generator 76, which generates electric current by using the rotation of the crankshaft 11. Travel electric power of electric power generated by the AC generator 76 is supplied to the travel DC motor, so that the lawn mower travels. Further, electric power for control is supplied to the control system such as the electronic governor motor 75 and the ECU 70.

The ECU 70 is provided with an engine rotational speed sensor 77, which detects the rotation of the internal combustion engine 10, and a throttle opening sensor 78 in order to control the operation of the internal combustion engine 10 and the travel DC motor 30. Data signals of the engine rotational speed detected by the engine rotational speed sensor 77 and the throttle opening detected by the throttle opening sensor 78 are input to the ECU 70.

When the ignition knob 89 is operated, the ignition switch 89s is turned on. When the travel lever 86 is operated to swing toward the front grip part 82, the travel lever switch 86s is turned on, and travel electric power generated by the AC generator 76 is supplied to the travel DC motor 30 whereby the travel DC motor thus begins to be operated. As a result, the lawn mower begins to travel.

If the blade lever 85 is operated to swing toward the rear grip part 82 after the push button 84 is depressed, the push button switch 84s and the blade lever switch 85s are sequentially turned on. Thus current is supplied to the electromagnetic clutch 20 and the electromagnetic coil 24 is energized.

Accordingly, the clutch 20 is brought into engagement and the blades 12 rotate. As a result, the operator can perform the mowing operation.

Figure 10:
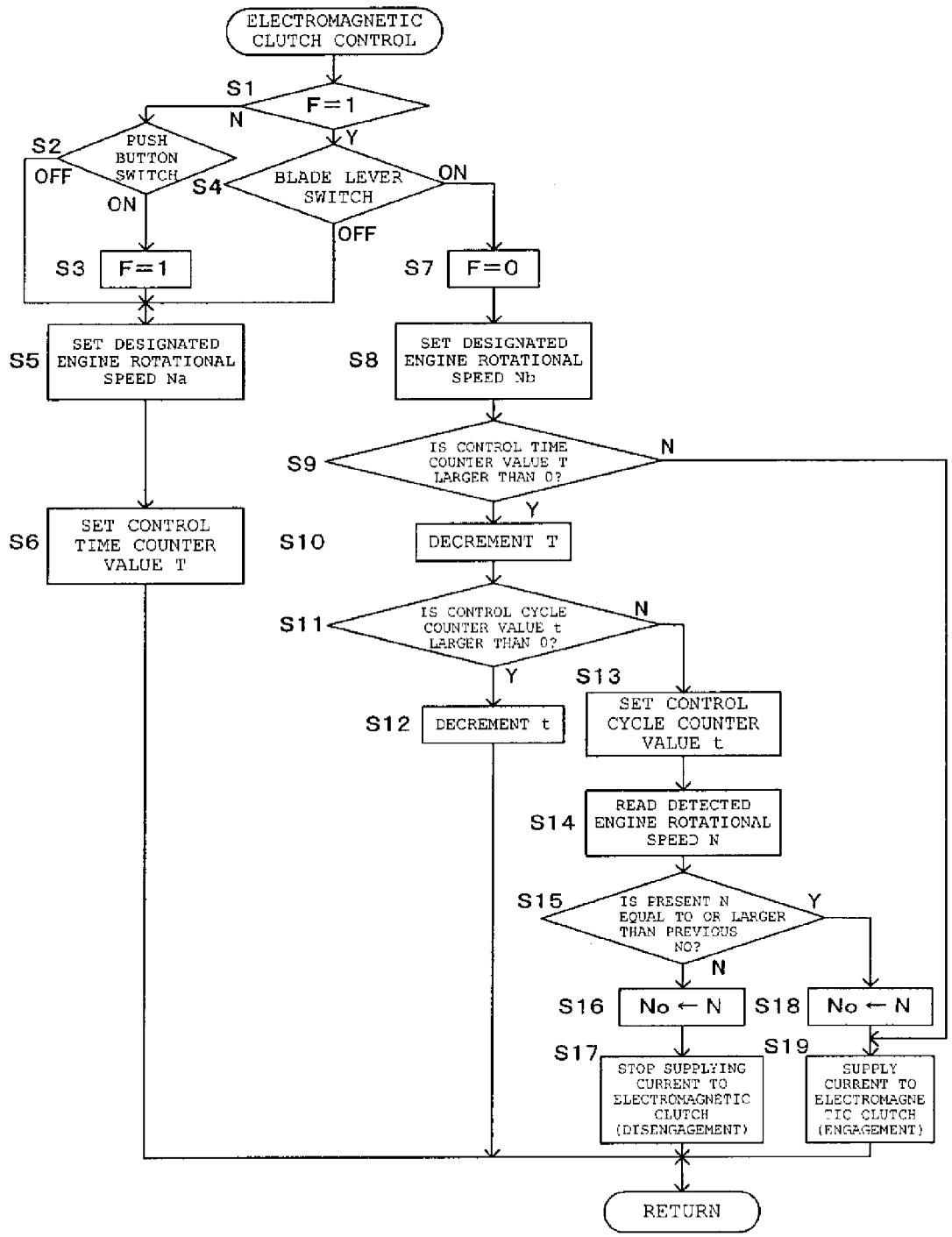
FIG. 10 is a flow chart showing a control procedure of an electromagnetic clutch in a first embodiment.

A first embodiment of the invention will be described with reference to FIG. 10, with respect to a control procedure of the electromagnetic clutch 20 controlled by the ECU 70 when the electromagnetic clutch 20 is engaged and the blades 12 are rotated by the power of the internal combustion engine 10.

First, when the push button switch 84s is turn on, it is determined whether a flag F indicating "1" rises (step S1). When the flag indicating "1" does not rise, the control procedure proceeds to step S2 and it is determined whether the push button switch 84s is turned on, that is, whether the push button switch 84s is depressed.

When the push button switch 84s is turned off, the control procedure proceeds to step S5, and a specified engine rotational speed of the internal combustion engine 10 is set to a predetermined engine rotational speed Na when the mowing operation is not performed. Then, a control time counter value T is set in step S6.

The control time counter value T corresponds to a maximum time in which the electromagnetic clutch 20 is controlled.

When the push button 84 is depressed and the push button switch 84s is turned on, the control procedure proceeds to step S3 from step S2 and the flag F indicating "1" rises. Then, the control procedure proceeds to step S5.

Accordingly, when the push button switch 84s is turned on, the flag F indicating "1" rises through the determination of the flag F in step S1. As a result, the control procedure proceeds to step S4.

In step S4, it is determined whether the blade lever switch 85s is turned on, that is, whether the blade lever 85 is operated.

Until the blade lever switch 85s is turned on, the control procedure proceeds to step S5 from step S4. When the blade lever 85 is operated and the blade lever switch 85s is turned on, the control procedure proceeds to step S7. Then, a flag F indicating "0" rises and the control procedure proceeds to step S8.

In step S8, the specified engine rotational speed Ns is set to a predetermined engine rotational speed Nb when the mowing operation is performed. The predetermined engine rotational speed Nb is higher than the engine rotational speed Na specified when the mowing operation is not performed.

When the push button 84 and the blade lever 85 are sequentially operated and the push button switch 84s and the blade lever switch 85s are sequentially turned on as described above, the operation control of the electromagnetic clutch 20 is performed.

Even though the blade lever 85 is operated to swing without depression of the push button 84, the operation control of the electromagnetic clutch 20 is not performed and it is not possible to perform the mowing operation.

When the push button switch 84s and the blade lever switch 85s are sequentially turned on in this order and the operation control of the electromagnetic clutch 20 is started, the control procedure proceeds to step S9 from steps S7 and S8. Then, it is determined whether the control time counter value T is positive. When the control time counter value T is positive, the control procedure proceeds to step S10. When the control time counter value T is 0 or less, the control procedure proceeds to step S19.

While the control time counter value T is positive, the control procedure proceeds to step S10 from step S9. Then, the control time counter value T is decremented, and the control procedure proceeds to step S11.

When control time reaches a predetermined control time so that the control time counter value T is repeatedly decremented and becomes thus 0 or less, the control procedure proceeds to step S19. Current is thus supplied to the electromagnetic clutch 20 so that the electromagnetic clutch is engaged to rotate the blades 12. As a result, the mowing operation is forcibly performed.

The reason for this is to prevent the operation control of the electromagnetic clutch 20 from being indefinitely repeated, and to stabilize the rotation of the blades 12.

When the control time counter value T is positive and the control procedure thus proceeds to steps S10 and S11 from step S9, it is determined whether a control cycle counter value t is positive.

The control cycle counter value t corresponds to a cycle in which the operation control of the electromagnetic clutch 20 is repeated.

While the control cycle counter value t is positive, the control procedure proceeds to step S12. Then, the control cycle counter value t is decremented.

When the control cycle counter value t is repeatedly decremented and becomes thus 0 or less, the control procedure proceeds to step S13 and the control cycle counter value t is set to a predetermined period.

The above-mentioned predetermined cycle is close to one cycle obtained from the specified engine rotational speed. Since the internal combustion engine 10 is a four-stroke cycle internal combustion engine, two revolutions of the engine is one cycle thereof. Therefore, it is considered that the predetermined cycle is set to an intermediate value between the period in the engine rotational speed when the mowing operation is not performed and the period in the engine rotational speed when the mowing operation is performed.

When the control cycle counter value t is set to a predetermined period in step S13, the control procedure proceeds to step S14 and engine rotational speed N detected by the engine rotational speed sensor 77 is read. Then, in step 15, present engine rotational speed N read in the present cycle is compared with previous engine rotational speed No read in the previous cycle (before one cycle). When the present engine rotational speed N is lower than the previous engine rotational speed No, the control procedure proceeds to step S16. When the present engine rotational speed N is equal to or higher than the previous engine rotational speed No, the control procedure proceeds to step S18.

When the present engine rotational speed N is lower than the previous engine rotational speed No and the engine rotational speed is decreasing as compared to the previous cycle (before one cycle), the control procedure proceeds to step S16. Then, the previous engine rotational speed No is replaced with the present engine rotational speed N, and current is not supplied to the electromagnetic clutch 20 in step S17. Thus the electromagnetic clutch 20 is disengaged and the blades 12 stop.

That is, when the engine rotational speed is decreasing, load applied to the rotating blades 12 is too large. When the electromagnetic clutch 20 is engaged, there is a possibility that the internal combustion engine 10 stops (engine stall occurs). For this reason, the electromagnetic clutch 20 is disengaged.

On the other hand, when the present engine rotational speed N is equal to or higher than the previous engine rotational speed No and the engine rotational speed is increasing as compared to the previous cycle (before one cycle), the control procedure proceeds to step S18. Then, the previous engine rotational speed No is replaced with the present engine rotational speed N, and current is supplied to the electromagnetic clutch 20 in step S19. Accordingly, the electromagnetic clutch 20 is engaged and the blades 12 rotate.

That is, when the engine rotational speed is increasing, there is no possibility that engine stall occurs. Therefore, the electromagnetic clutch 20 is engaged to rotate the blades 12.

As described above, until the control time (control time counter value T) has elapsed, the present engine rotational speed N is compared with the previous engine rotational speed No in every control cycle (control cycle counter value t). When the engine rotational speed is decreasing, the electromagnetic clutch 20 is disengaged. When the engine rotational speed is increasing, the electromagnetic clutch 20 is engaged. The electromagnetic clutch 20 is engaged depending on the repetition of the above-mentioned engagement and disengagement of the electromagnetic clutch, whereby engine stall is prevented. It is thus possible to reliably engage the electromagnetic clutch without the occurrence of the engine stall.

After the control time has elapsed, the internal combustion engine 10 can generally run at the specified engine rotational speed. Accordingly, the electromagnetic clutch 20 is maintained in the engaged state, so that the mowing operation is performed in the ordinary manner.

The electromagnetic clutch 20 is controlled on the basis of engine rotational speed. Therefore, it is possible to reliably transmit the power of the internal combustion engine 10 to the blades 12 by using the electromagnetic clutch 20 without the occurrence of the engine stall and without influence on the load following characteristic of the internal combustion engine, the characteristic of the clutch, and load fluctuation.

Figure 11:
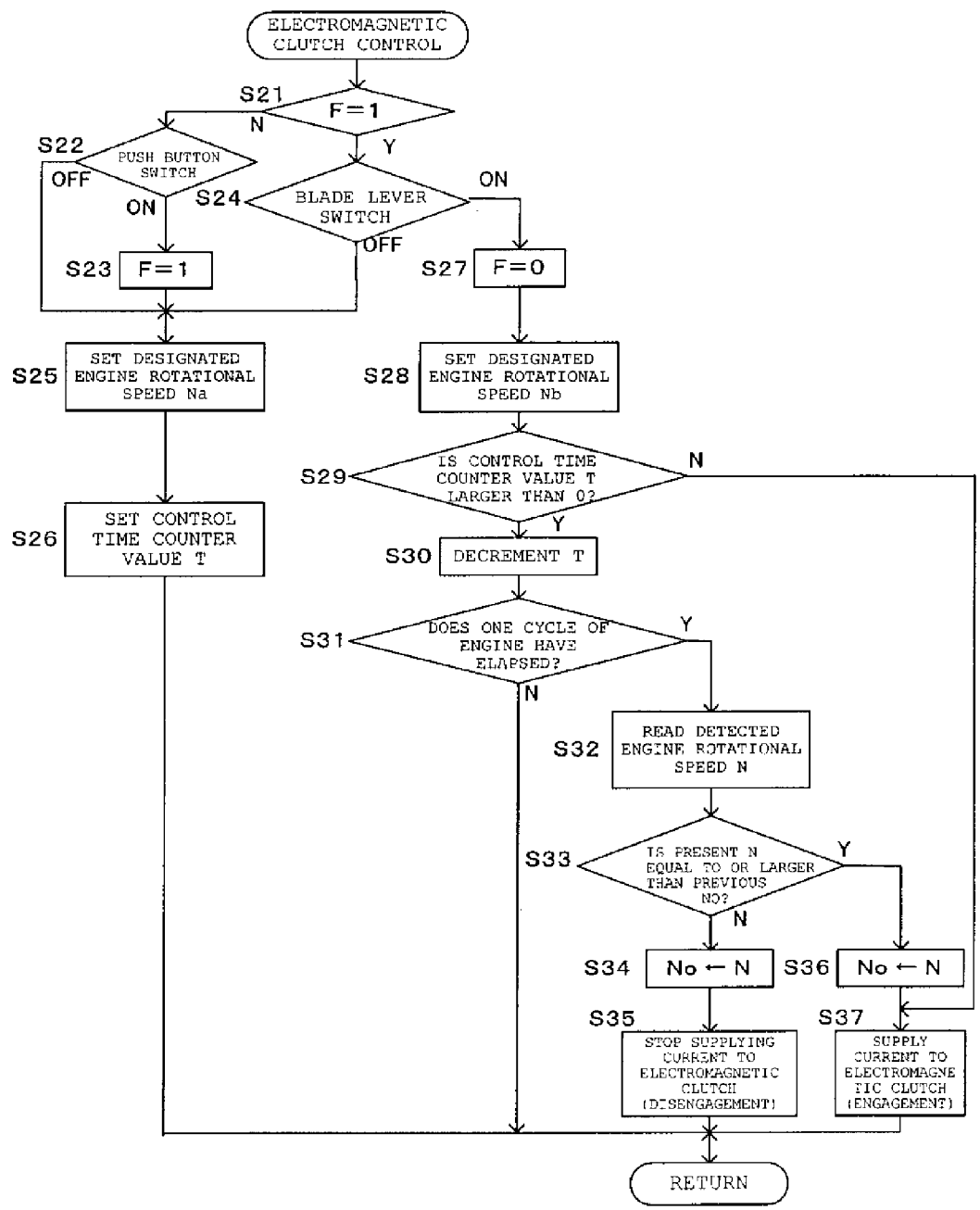
FIG. 11 is a flow chart showing a control procedure of an electromagnetic clutch in a second embodiment.

Next, a second embodiment of the invention will be described with reference to FIG. 11, with respect to a control procedure of the electromagnetic clutch 20.

According to the first embodiment, the control cycle is a constant cycle close to one cycle, which is previously obtained from the specified engine rotational speed Ns. However, according to the second embodiment, one cycle used as the control cycle is obtained from present engine rotational speed N, which is detected by the engine rotational speed sensor 77.

Steps S21 to S30 of the second embodiment are the same as steps S1 to S10 of the first embodiment. Further, steps S32 to S37 of the second embodiment are the same as steps S14 to S19 of the first embodiment.

With respect to the determination in step S31 of whether one cycle of the internal combustion engine has elapsed, the elapse of the initial cycle is determined by using one cycle obtained from the specified engine rotational speed when the mowing operation is not performed. Further, the elapse of the next cycle is determined by using one cycle obtained on the basis of the detected engine rotational speed N read in step S32.

Accordingly, until the control time (control time counter value T) has elapsed, present engine rotational speed N is compared with previous engine rotational speed No in every cycle of the internal combustion engine 10. When the engine rotational speed is decreasing, the electromagnetic clutch 20 is disengaged. When the engine rotational speed is increasing, the electromagnetic clutch 20 is engaged. The electromagnetic clutch 20 is engaged depending on the repetition of the above-mentioned engagement and disengagement of the electromagnetic clutch, whereby engine stall is prevented. Therefore, it is possible to reliably engage the electromagnetic clutch without the occurrence of the engine stall.

Since the periodical control of the electromagnetic clutch 20 is performed only within the control time, the abrasion of the electromagnetic clutch is suppressed.

Figure 12:
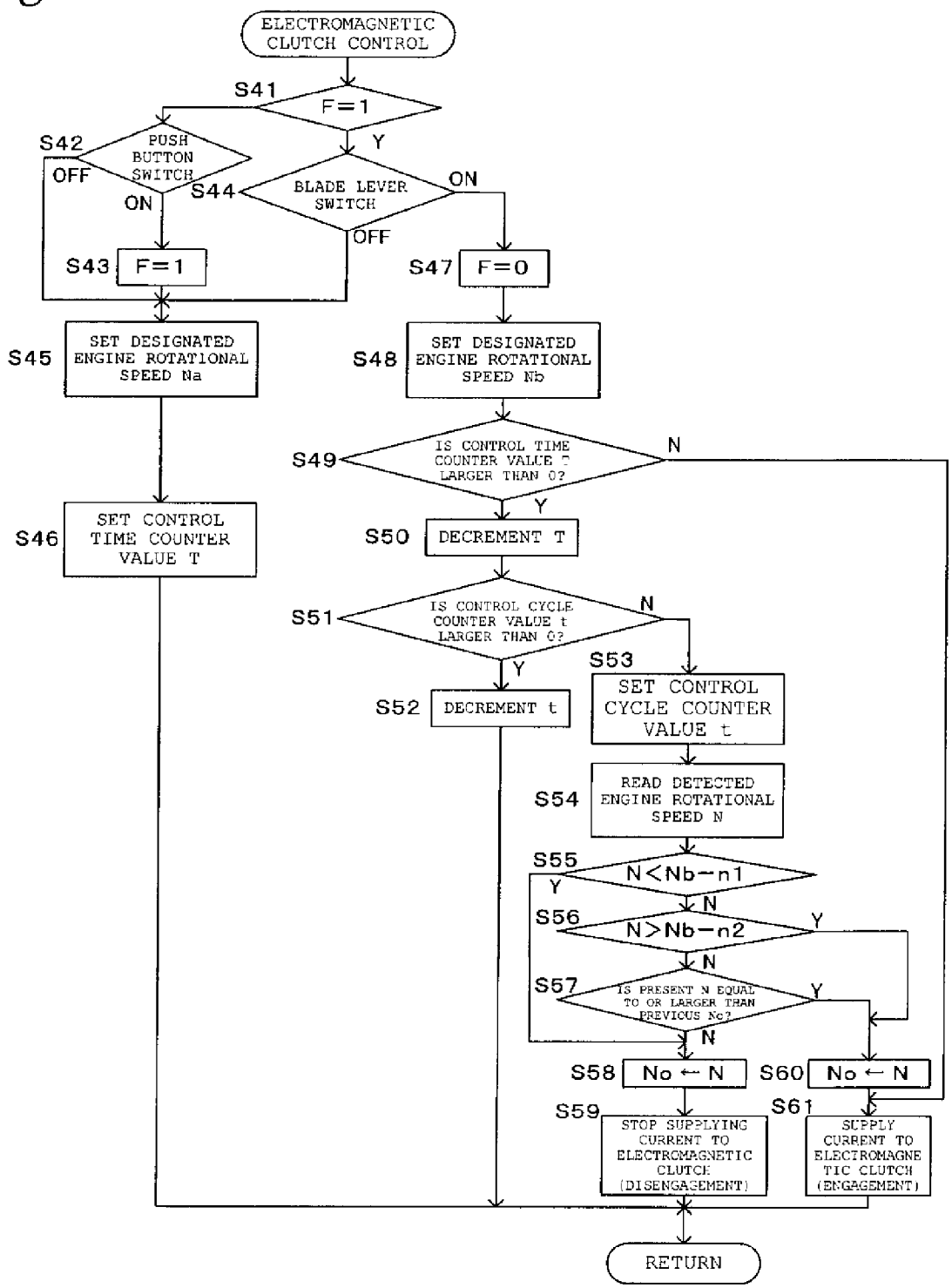
FIG. 12 is a flow chart showing a control procedure of an electromagnetic clutch in a third embodiment.

Next, a third embodiment of the invention will be described with reference to FIG. 12, with respect to a control procedure of the electromagnetic clutch 20.

Steps S41 to S54 of the third embodiment are the same as steps S1 to S14 of the first embodiment.

Further, when the control cycle counter value t is repeatedly decremented and becomes thus 0 or less, the control procedure proceeds to step S53 and the control cycle counter value t is set to a predetermined period. The detected engine rotational speed N is read in step S54. Then, in step S55, it is determined whether the detected engine rotational speed N is lower than a lower limit engine rotational speed. In this case, the lower limit engine rotational speed is lower than the specified engine rotational speed Ns by a first predetermined rotational speed n1.

When the detected engine rotational speed N is lower than the lower limit engine rotational speed, the control procedure proceeds to step S58. Then, the previous engine rotational speed No is replaced with the present engine rotational speed N, and current is not supplied to the electromagnetic clutch 20 in step S59. Accordingly, the electromagnetic clutch 20 is disengaged and the blades 12 stop.

When output deteriorates due to decrease of the engine rotational speed caused by the characteristic of the internal combustion engine, there is a possibility that the engine rotational speed is repeatedly increased and decreased at a low level of the engine rotational speed due to a load, which is applied through the electromagnetic clutch 20. However, the electromagnetic clutch 20 is forcibly disengaged in the case of the low engine rotational speed lower than the lower limit engine rotational speed. Accordingly, after step S57 to be described below, it is possible to prevent the repetition of the engagement and disengagement of the electromagnetic clutch 20 at a low level of the engine rotational speed.

In the case of a low engine rotational speed lower than the lower limit engine rotational speed, there is a possibility that engine stall occurs. Since the finishing of the mowing operation in such a case is not excellent and the low engine rotational speed is not suitable for the mowing operation. For this reason, the electromagnetic clutch 20 is forcibly disengaged and the mowing operation is stopped.

If it is determined in step S55 that the detected engine rotational speed N exceeds the lower limit engine rotational speed, the control procedure proceeds to step S56 and it is determined whether the detected engine rotational speed N is equal to or lower than an upper limit engine rotational speed. In this case, the upper limit engine rotational speed is lower than the specified engine rotational speed Ns by a second predetermined rotational speed n2.

Meanwhile, the first predetermined rotational speed n1 is higher than the second predetermined rotational speed n2.

When the detected engine rotational speed N is equal to or higher than the upper limit engine rotational speed, the control procedure proceeds to step S60. Then, the previous engine rotational speed No is replaced with the present engine rotational speed N, and current is supplied to the electromagnetic clutch 20 in step S61. Accordingly, the electromagnetic clutch 20 is engaged and the blades 12 rotate.

When the detected engine rotational speed is equal to or higher than the upper limit engine rotational speed and is close to the specified engine rotational speed, engine stall does not occur even though the engine rotational speed is decreased, and the finishing of the mowing operation is also excellent. Accordingly, the electromagnetic clutch is maintained in the engaged state, and the number of the repetition of the engagement and disengagement of the electromagnetic clutch 20 is reduced as much as possible. In addition, the electromagnetic clutch is quickly and reliably engaged without the occurrence of the engine stall.

If it is determined in step S56 that the detected engine rotational speed N is lower than the upper limit engine rotational speed, the control procedure proceeds to step S57.

That is, when the detected engine rotational speed N is equal to or higher than the lower limit engine rotational speed and is lower than the upper limit engine rotational speed, the control procedure proceeds to step S57 and present engine rotational speed N read in the present cycle is compared with previous engine rotational speed No read in the previous cycle (before one cycle).

When the present engine rotational speed N is lower than the previous engine rotational speed No, the control procedure proceeds to step S58. Then, the previous engine rotational speed No is replaced with the present engine rotational speed N, and current is not supplied to the electromagnetic clutch 20 in step S59. Accordingly, the electromagnetic clutch 20 is disengaged and the blades 12 stop. Meanwhile, when the present engine rotational speed N is equal to or higher than the previous engine rotational speed No, the control procedure proceeds to step S60. Then, the previous engine rotational speed No is replaced with the present engine rotational speed N, and current is supplied to the electromagnetic clutch 20 in step S61. Accordingly, the electromagnetic clutch 20 is engaged and the blades 12 rotate.

When the detected engine rotational speed N is lower than the lower limit engine rotational speed and is far lower than the specified engine rotational speed Ns, the electromagnetic clutch 20 is maintained in the disengaged state. When the detected engine rotational speed N is equal to or higher than the upper limit engine rotational speed and is close to the specified engine rotational speed Ns, the electromagnetic clutch 20 is maintained in the engaged state. When the detected engine rotational speed N is an intermediate value between the lower and upper limit engine rotational speeds, the electromagnetic clutch 20 is engaged if the engine rotational speed is increasing. When the engine rotational speed is decreasing, the electromagnetic clutch 20 is disengaged. Accordingly, the number of the repetition of the engagement and disengagement of the electromagnetic clutch 20 is reduced as much as possible. In addition, it is possible to quickly and reliably engage the electromagnetic clutch without the occurrence of engine stall.

The periodical control of the electromagnetic clutch 20 is performed only within the control time, and the number of the repetition of the engagement and disengagement of the electromagnetic clutch 20 can be reduced as much as possible even within the control time. Therefore, the abrasion of the electromagnetic clutch 20 is further suppressed.

Figure 13:
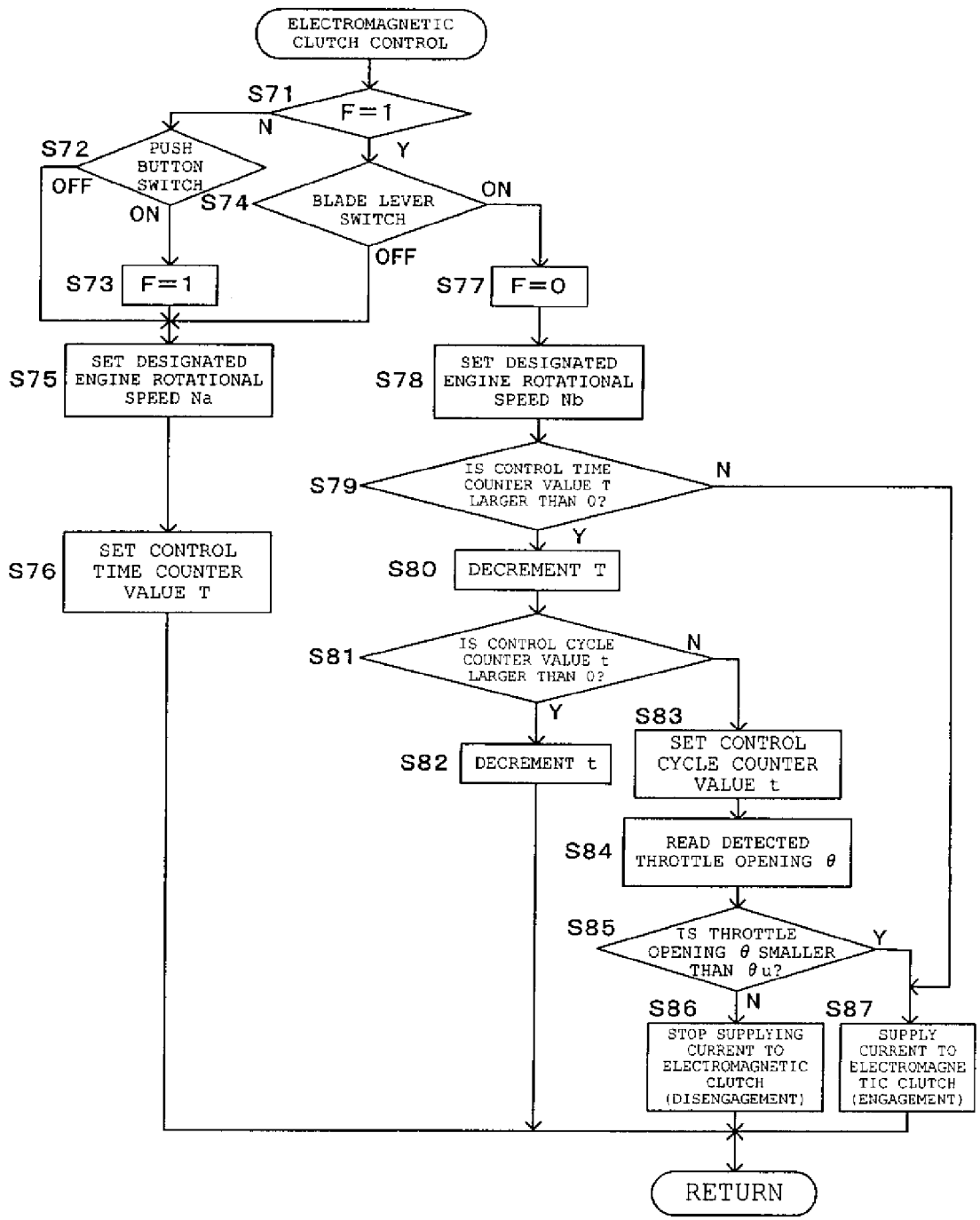
FIG. 13 is a flow chart showing a control procedure of an electromagnetic clutch in a fourth embodiment.

Next, a fourth embodiment of the invention will be described with reference to FIG. 13, with respect to a control procedure of the electromagnetic clutch 20.

According to the fourth embodiment, the operation of the electromagnetic clutch 20 is controlled on the basis of throttle opening θ that is a valve opening of a throttle valve of the air intake system of the internal combustion engine 10, instead of the engine rotational speed N in the above-mentioned embodiments.

The throttle opening θ is detected by the throttle opening sensor 78.

Steps S71 to S83 of the fourth embodiment are the same as steps S1 to S13 of the first embodiment.

When the control cycle counter value t is repeatedly decremented and becomes thus 0 or less, the control procedure proceeds to step S83 and the control cycle counter value t is set to a predetermined period. Then, the throttle opening θ detected by the throttle opening sensor 78 is read in step S84, and it is determined whether detected throttle opening θ is smaller than an upper limit throttle opening θu (for example, opening of 80%) in step S85.

When the detected throttle opening θ is equal to or larger than the upper limit throttle opening θu, the control procedure proceeds to step S86 and current is not supplied to the electromagnetic clutch 20. Accordingly, the electromagnetic clutch 20 is disengaged. When the detected throttle opening θ is smaller than the upper limit throttle opening θu, current is supplied to the electromagnetic clutch 20. Accordingly, the electromagnetic clutch 20 is engaged and the blades 12 rotate.

That is, when the detected throttle opening θ is equal to or larger than the upper limit throttle opening θu and the internal combustion engine 10 does not have a margin in output thereof, there is a possibility that engine stall occurs if there is any load fluctuation. Therefore, the electromagnetic clutch 20 is disengaged. When the detected throttle opening θ is smaller than the upper limit throttle opening θu and the internal combustion engine 10 has a margin in output thereof, the electromagnetic clutch 20 is engaged and the blades 12 rotate.

The engagement and disengagement control of the electromagnetic clutch 20, which is performed by using the throttle opening θ in steps S83 to S87, is performed in every control cycle t within the control time T. Therefore, it is possible to reliably engage the electromagnetic clutch 20 without the occurrence of engine stall.

Since the electromagnetic clutch 20 is controlled on the basis of throttle opening θ, it is possible to reliably transmit the power of the internal combustion engine 10 to the blades 12 by using the electromagnetic clutch 20 without the occurrence of engine stall and without an influence on the load following characteristic of the internal combustion engine 10, the characteristic of the clutch, and load fluctuation.

Since the periodical control of the electromagnetic clutch 20 is performed only within the control time, the abrasion of the electromagnetic clutch 20 is suppressed.

The invention has been described as applied to a hybrid self-propelled lawn mower in the above-mentioned embodiments. However, the invention may be applied to a self-propelled lawn mower, which performs a mowing operation by using an internal combustion engine and also travels by using an internal combustion engine.

What is claimed is:

1. A power-transmission control mechanism for a lawn mower in which power of an internal combustion engine is transmitted to a mowing blade through an electromagnetic clutch, wherein;
    the power-transmission control mechanism comprises:
    an operating switch that is turned on or off by an operator;
    an engine rotational speed detector that detects engine rotational speed of the internal combustion engine; and
    an electromagnetic clutch controller that controls operation of the electromagnetic clutch on the basis of an operation signal of the operating switch and the engine rotational speed detected by the engine rotational speed detector; and
    wherein the electromagnetic clutch controller is configured to periodically repeats:
    reading the engine rotational speed detected by the engine rotational speed detector, during a predetermined time, when the operating switch is turned on,
    comparing a present engine rotational speed read in present cycle with a previous engine rotational speed read in a previous cycle,
    engaging the electromagnetic clutch when the present engine rotational speed is equal to or higher than the previous engine rotational speed, and
    disengaging the electromagnetic clutch when the present engine rotational speed is lower than the previous engine rotational speed.

2. The power-transmission control mechanism according to claim 1,
    wherein the predetermined time is set on the basis of a period of one cycle of the internal combustion engine.

3. A power-transmission control mechanism for a lawn mower in which power of an internal combustion engine is transmitted to a mowing blade through an electromagnetic clutch, wherein the power-transmission control mechanism comprises:
    an operating switch that is turned on or off by an operator;
    an engine rotational speed detector that detects engine rotational speed of the internal combustion engine; and
    an electromagnetic clutch controller that controls operation of the electromagnetic clutch on the basis of an operation signal of the operating switch and the engine rotational speed detected by the engine rotational speed detector; and
    wherein the electromagnetic clutch controller is configured to periodically repeats:
    reading the engine rotational speed detected by the engine rotational speed detector, during a predetermined time, when the operating switch is turned on,
    disengaging the electromagnetic clutch when the read engine rotational speed is lower than a lower limit engine rotational speed, which is lower than a specified engine rotational speed by a first predetermined rotational speed,
    engaging the electromagnetic clutch when the read engine rotational speed is equal to or higher than an upper limit engine rotational speed, which is lower than the specified engine rotational speed by second predetermined rotational speed,
    comparing the present engine rotational speed read in present cycle with a previous engine rotational speed read in a previous cycle, when the read engine rotational speed in the present cycle is equal to or higher than the lower limit engine rotational speed and is lower than the upper limit engine rotational speed,
    engaging the electromagnetic clutch when the present engine rotational speed is equal to or higher than the previous engine rotational speed, and
    disengaging the electromagnetic clutch when the present engine rotational speed is lower than the previous engine rotational speed.

4. A power-transmission control mechanism for a lawn mower in which power of an internal combustion engine is transmitted to a mowing blade through an electromagnetic clutch, wherein the power-transmission control mechanism comprises:
    an operating switch that is turned on or off by an operator;
    a throttle opening detector that detects a throttle opening of a throttle valve provided in an inlet system of the internal combustion engine; and
    an electromagnetic clutch controller that controls operation of the electromagnetic clutch on the basis of an operation signal of the operating switch and the throttle opening detected by the throttle opening detector; and
    wherein the electromagnetic clutch controller is configured to periodically repeats:
    reading the throttle opening detected by the throttle opening detector, during a predetermined time, when the operating switch is turned on,
    engaging the electromagnetic clutch when the read throttle opening is smaller than an upper limit throttle opening, and
    disengaging the electromagnetic clutch when the read throttle opening is equal to or larger than the upper limit throttle opening.

* * * * *